United States Patent [19]

Hansen

[11] Patent Number: 4,472,716
[45] Date of Patent: Sep. 18, 1984

[54] PHASE SENSITIVE GUIDANCE SENSOR FOR WIRE-FOLLOWING VEHICLES

[75] Inventor: George R. Hansen, Arcadia, Calif.

[73] Assignee: The United States of America as represented by the Administrator of the National Aeronautics and Space Administration, Washington, D.C.

[21] Appl. No.: 315,583

[22] Filed: Oct. 30, 1981

[51] Int. Cl.³ .................. G08G 1/09; B60K 31/00
[52] U.S. Cl. ............................. 340/905; 180/168; 318/587; 340/988
[58] Field of Search ................ 340/22, 23, 32, 901, 340/988, 905; 180/167-169; 364/432, 441; 318/587

[56] References Cited

U.S. PATENT DOCUMENTS

| Re. 30,492 | 1/1981 | Blakeslee | 180/168 |
|---|---|---|---|
| 3,154,946 | 11/1964 | Ordorica | |
| 3,612,206 | 10/1971 | Ohntrup | 180/168 |
| 3,893,090 | 7/1975 | Neuner | |
| 3,993,156 | 11/1976 | Rubel | 318/587 |
| 4,079,803 | 3/1978 | Takada et al. | 318/587 |
| 4,083,422 | 4/1978 | Blakeslee | 318/587 |
| 4,172,551 | 10/1979 | Johnson | 180/168 |
| 4,307,329 | 12/1981 | Taylor | 318/587 |
| 4,361,202 | 11/1982 | Minovitch | 180/168 |

FOREIGN PATENT DOCUMENTS 50-15249 2/1975 Japan.

OTHER PUBLICATIONS

*Proceedings of the IEEE*, vol. 61, No. 12, Olson, pp. 1764-1765, Dec. 1977.
*IEEE Transactions on Vehicular Technology*, Olson, vol. VT-26, No. 2, May 1977, pp. 161-172.
*IEEE Transactions on Automatic Control*, Fenton, vol. AC-21, No. 3, Jun. 1976, pp. 306-315.

*Primary Examiner*—James J. Groody
*Attorney, Agent, or Firm*—Paul F. McCaul; Thomas H. Jones; John R. Manning

[57] ABSTRACT

A guidance sensor for a wire-following vehicle which is phase sensitive, includes an array of coils (C1-C16) positioned to sense the vertical component of a magnetic field (17) produced by the AC current through the guidance wire 15. The outputs of the coils are fed to associated flip flops (FF1-FF16). Flip flops associated with coils, through which flux passes in one direction, e.g. up, are driven to one state, e.g. true, and flip flops associated with coils through which flux passes in the opposite direction, e.g. down, are driven to a false state. The control signal to guide the vehicle to be over the wire is a function of the number of flip flops in the true state. Circuitry (45, 46) is included to prevent flip flops from assuming a wrong state due to noise.

9 Claims, 5 Drawing Figures

PHASE SENSITIVE GUIDANCE SENSOR FOR WIRE-FOLLOWING VEHICLES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

FIELD OF THE INVENTION

The present invention generally relates to a wire guidance system, and, more particularly, to a phase sensitive guidance sensor for a wire guidance system.

BACKGROUND OF THE INVENTION

Existing wire guidance systems typically use a pair of pickup coils which are excited by low frequency current in the guidance wire. The output of the sensing system is a pair of voltages, proportional to the distances from each coil to the wire. If both sensing coils are at equal distances from the wire (and the coils are mounted symmetrically on the vehicle) then the output voltages will be equal - indicating that the wire is located under the center of the vehicle. However, if the vehicle moves to one side of the wire, the opposite coil will put out a greater voltage, which can be used to turn the vehicle front wheels in the proper direction.

Typically, the coils are mounted ahead of the wheels often in a non-magnetic bumper. This approach suffers from the problem that electromagnetic noise often induces false signals and distorts the location indication of the system. A sudden move to one side or the other, especially as the result of a bump or lurch, of the vehicle can also degrade the reliability of the sensing. Thus, the vehicle guidance is affected. This is particularly true when the vehicle speed is considerable, e.g. 60 mph or more.

A need, therefore, exists for a guidance sensor which is reliable and is not effected by electromagnetic or other type of noise and which is responsive to sudden moves of the vehicle travelling at relatively high speeds.

SUMMARY OF THE INVENTION

The present invention comprises a guidance sensor for wire-following vehicles which is phase sensitive, rather than amplitude sensitive. The guidance sensor includes an array of coils positioned to sense the vertical component of the magnetic field, produced by the AC current through the guidance wires. The outputs of the coils are fed to logic circuitry which is interconnected so as to immunize the system from external noise and to produce a guidance control signal which depends only on the relative position of the coil array over the guidance wire.

The novel features of the invention are set forth with particularity in the appended claims. The invention will be best understood from the following description when read in conjunction with the accompanying drawings.

DETAILED DESCRIPTION OF THE DRAWINGS

Figure 1:
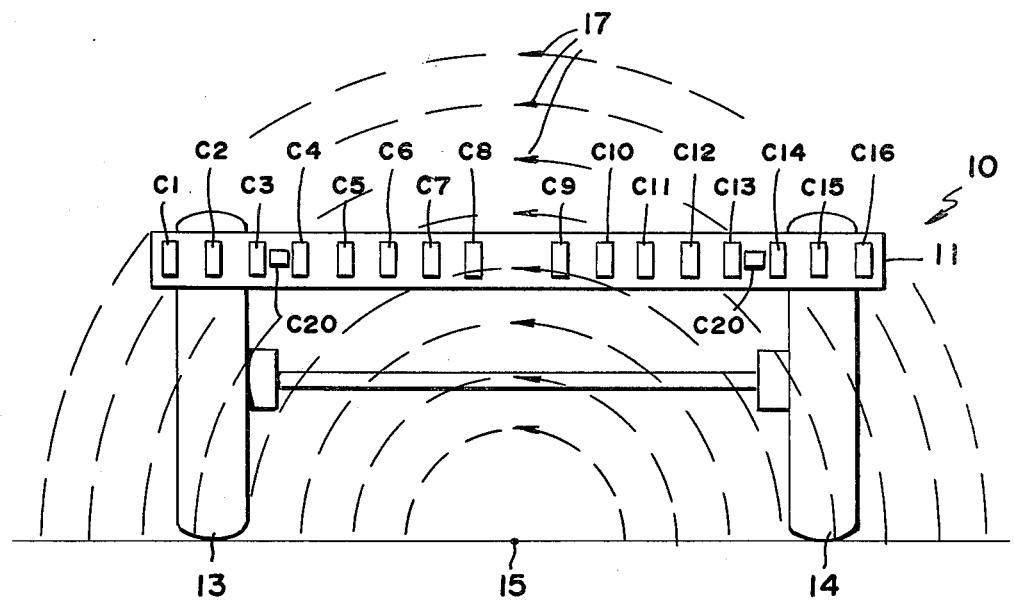
FIG. 1 is a front view of a vehicle with an array of sensing coils.

Attention is first directed to FIG. 1 which shows a vertical view of an array of a plurality, e.g. 16 sensing coils, designated C1-C16. These coils are mounted on the non-magnetic channel of a front bumper 11 of a vehicle 10. For simplicity, only the bumper 11 and the front wheels 13 and 14 of the vehicle are shown. In FIG. 1, the vehicle is shown centered at over the guidewire 15 which is on the terrain over which the vehicle is to travel. When the vehicle is centered about the guidewire, half the number of the sensing coils, i.e. eight, are on one side of the wire and half are on the other side.

The wire 15 is excited by a relatively low frequency current, e.g. 6 to 7 kHz of an amplitude sufficient to produce a magnetic field as shown. As depicted in FIG. 1, the current is assumed to issue out of the wire towards the viewer thereby causing a magnetic field with a counter-clockwise flux polarity, as represented by arrows 17. It is appreciated that during the other half cycle, the current and flux change direction and polarity.

The longitudinal axes of the sensing coils C1-C16 are vertical. Thus, they are sensitive only to the vertical components of the flux. The coils near the ends of the bumper, such as C1 and C16, have their axes almost aligned with the flux lines passing through them, thus are highly responsive to the vertical component of the flux. The coils at the center, such as C8 and C9, are about at right angles to the flux lines and will have a small vertical component of flux along their sensing axes. However, since field strength is inversely proportional to distance, the outer coils are in a weak field and the center coils in a strong field, which tends to reduce the amplitude differences induced by the geometry. In the present invention, amplitudes are not used. The induced outputs of the coils are amplified and clipped, to give a uniform output voltage for each. Instead, phase differences are employed, as will be explained hereafter in detail.

Coil C1 at the end of the bumper to the viewer's left has the vertical component passing downward through it. On the other hand, the coil on the other end, i.e. C16, has the vertical component passing upward. Consequently, the two coils will have output voltages which are in opposite phase relationship. This is also true for the next more-inward pair of coils C2 and C15, and of all coils. The most central pair of coils C8 and C9, will also have oppositely phased outputs if they straddle the wire, as shown. This indicates centering of the vehicle over the wire.

Each of the sensing coils has associated with it a flip flop, which is clocked at an appropriate time, as will be described. The state of the flip flop when clocked is dependent on the direction of flux through the associated coil and the states of adjacent flip flops. However, the latter aspect may be ignored for the time being until the basic concept of the invention is fully appreciated.

For explanatory purposes, let it be assumed that the flip flops are clocked when the flux polarity is as shown in FIG. 1 and that a coil sensing an upward flux sets its associated flip flop to a true or 1 state, while a coil with a downward flux drives the flip flop to a false or 0 state. For the particular geometry shown in FIG. 1, coils C9–C16 would drive their flip flops to a 1 state and C1–C8 would drive their flip flops to a 0 state. Thus, out of the 16 flip flops, the largest number of flip flops in the 1 state would be eight. This indicates that the vehicle is centered over the wire.

If the vehicle were to veer to the right, as viewed by a viewer of FIG. 1, coil C8 would have the flux pass through it in an upward direction. Thus, nine rather than eight out of the sixteen flip flops will have a 1 output, which would indicate a slight off course direction to the right. On the other hand, if the vehicle were to veer to the left, so that coils C9 and C10 straddle the wire, the largest number of flip flops in the 1 state would be seven rather than eight, indicating an off course direction to the left. In the present invention, after the flip flops are clocked their states are sensed to determine the largest number of 1's and based thereon, a control signal is applied to the vehicle to turn in such a direction so that coils C8 and C9 straddle the wire, and as a result, the largest number of 1's is eight.

As previously pointed out, the clocking is provided during each cycle of the AC current through the wire which results in a change in flux direction. With a current frequency of 6 or 7 kHz the control signal is updated 6000 to 7000 times per second. Thus, even if the vehicle were to travel at a speed of 60 mph or 88 feet/second the control signal is updated at a sufficiently high rate to maintain the vehicle on course.

As shown in FIG. 1, also placed on bumper 11 are a pair of coils 20 which are used as reference coils to produce clocking pulses. These coils 20 are positioned horizontally so that their outputs are sensitive to the horizontal component of the flux. With any flux polarity the flux passes both coils 20 in the same direction, which is from right to left for the flux polarity shown in FIG. 1. For explanatory purposes, let it be assumed that when the flux through coils 20 is from right to left their combined outputs is true or a binary 1, and is a 0 when the flux passes from left to right. In practice, the combined output of coils 20 is amplified and clipped to form a square wave. It is the positive rise of this wave that is used as the clocking signal.

Figure 2:
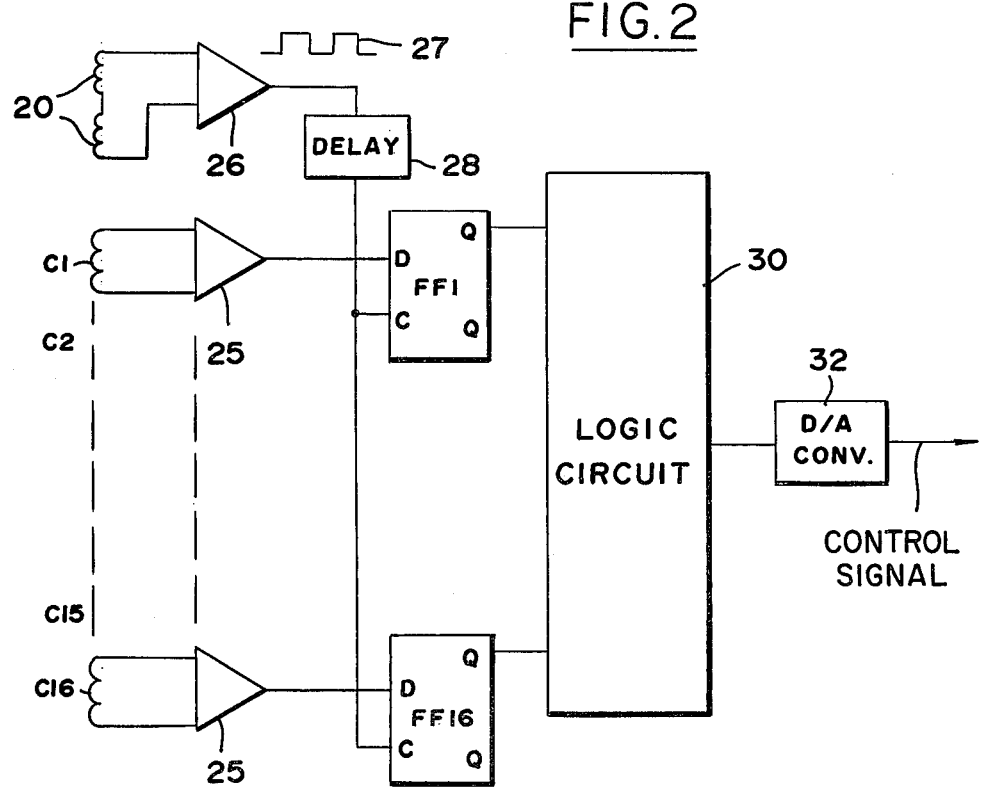
FIG. 2 is a diagram of circuitry associated with the sensing coils.
Figure 3:
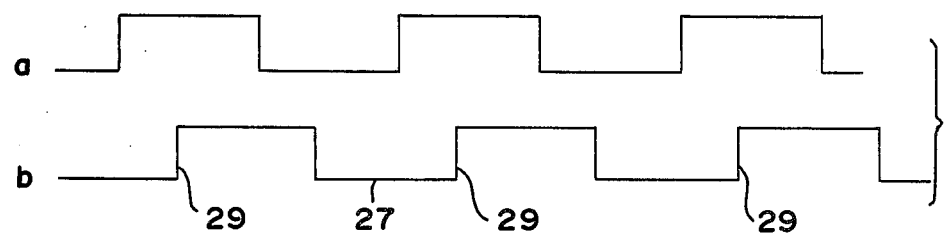
FIGS. 3 and 4 are waveform diagrams, useful in exploring the invention.
Figure 4:
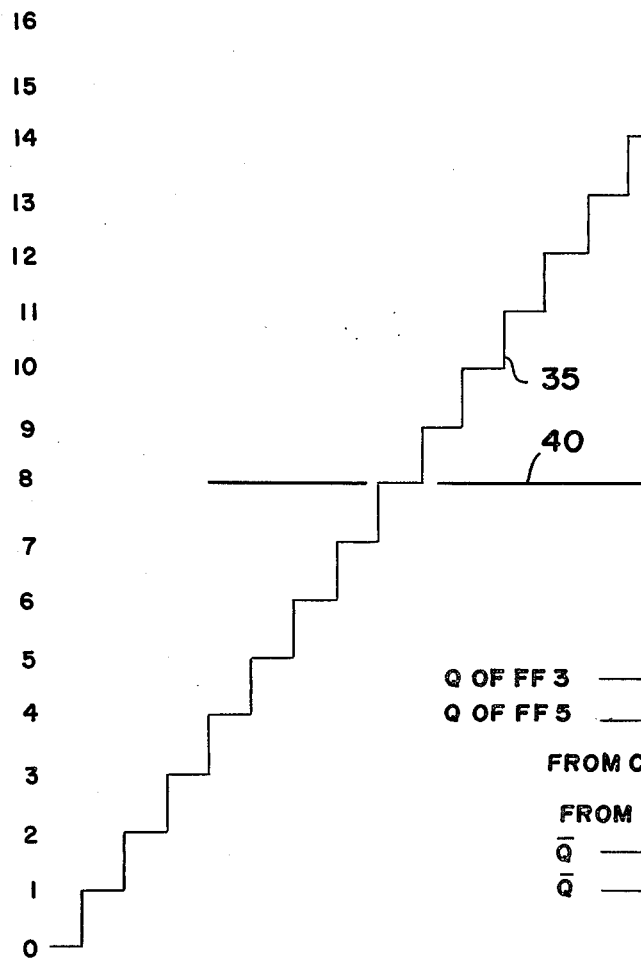

The foregoing described aspects of the invention may best be summarized in connection with FIGS. 2–4, to which reference is now made. As shown in FIG. 2, each of the sensing coils C1–C16 is connected to its amplifier-clipper 25 whose output is supplied to the flip flop associated with the sensing coil. In FIG. 2, for simplicity only, coils C1 and C16 are shown with their associated amplifiers 25 and flip flops FF1 for coil C1 and FF16 for coil C16.

As to the reference coils 20, they are connected in series as inputs to their amplifier-clipper 26. The output of the latter is a squarewave-shaped signal 27, which after being delayed by delay 28 is fed as a clocking signal to the flip flops. As previously assumed when the flux passes through coils 20 from right to left (as shown in FIG. 1) the signal 27 is high. Also, previously assumed, the clipped outputs of the sensing coils are high when the flux through them passes from top to bottom.

Attention is now directed to FIG. 3, wherein in line 'a' the clipped output of a sensing coil is shown while in line 'b' the delayed clocking signal from delay 28 is shown. It is assumed that clocking takes place during the negative to positive transitions 29 of signal 27. Thus, when a flip flop is clocked and its input is high, i.e. its output at the coil is high or a binary 1, due to the fact that flux passes through it from bottom to top, the flip flop is set to a 1, and thus its Q output is high, representing a 1. On the other hand, if the flux passes through a sensing coil, from top to bottom, its output is low. Therefore, the flip flop is driven to a 0 state and therefore, its Q output is low or a 0.

As shown in FIG. 2, the Q outputs of the 16 flip flops associated with sensing coils C1–C16, are applied to a logic circuit 30. Its function is to determine the largest number of flip flops which are in the 1 state and apply a digital control signal corresponding to the number of flip flops in the 1 state to a digital-to-analog converter 32, which converts the digital control signal to an analog signal. It is this signal that is used to control the steering of the vehicle to straddle the wire.

Logic circuit 30 is shown in block form, since various circuit arrangements may be employed to produce a staircase output, related to the largest number of its input signals which are in a given state, e.g. a 1 state. In one embodiment two 8-bit priority encoders of RCA type CD 4532B were used.

The number of flip flops which are in a 1 state, can vary from zero, in case the vehicle were to veer sharply to the left (see FIG. 1) so that all the coils, including C16, have the flux passing through them from top to bottom, i.e., upwardly, to a case where all flip flops were in a 1 state, if the vehicle were to veer sharply to the right, so that the flux passes upwardly even through coil C1. Thus, the output of circuit 30 can be anyone of 0 thru 16 numbers, which when converted to analog signals would produce a staircase analog signal as shown in FIG. 4 and designated by 35.

Referring again to FIG. 1, it should be appreciated that when the vehicle is properly positioned above the wire 15 coils C8 and C9 straddle the wire. Thus, out of the 16 coils, 8 of the coils will have 1 output. Consequently, when clocked, the control signal will have a level as indicated by line 40 in FIG. 4. Vehicle veering to the left, will produce a control signal of a higher level, since the number of coils with 1 output will be greater than 8.

Since the level of the control signal depends on the number of flip flops in a 1 state, it is important to prevent a flip flop from assuming the wrong state due to the effect of noise, such as electromagnetic noise, on its associated coil. Based on the foregoing, it should be appreciated that except for the case wherein the vehicle is in a position so that one of the coils is exactly over the wire, each time clocking takes place there will be two coils straddling the wire.

Likewise, as to coil C8 its neighboring coils C7 and C9 produce 0 and 1 outputs respectively. Thus, under proper operating conditions, only the flip flops associated with coils straddling the wire should have neighboring flip flops in opposite state.

Each of the coils stradding the wire will have two neighboring coils, producing opposite outputs. For example, as shown in FIG. 1, coils C10 and C8 on either side of coil C9 have 1 and 0 outputs respectively.

In order to prevent spurious signals from improperly changing states of flip flops, in accordance with the present invention, a flip flop, when clocked can change state only if its two neighboring flip flops are of opposite states. On the other hand, if the two neighboring flip flops are of the same state, the flip flop regardless of the input from its associated coil, is forced to the same state of the neighboring flip flops.

The importance of this aspect of the invention may be highlighted by again referring to FIG. 1. As previously indicated, for the particular geometry where the vehicle straddles the wire, the number of 1's should be eight. Assuming however that due to noise, coil C12 were to produce a 0 output instead of a 1. This would have reduced the number of 1's to seven. However, in accordance with the present invention, since the flip flops FF11 and FF13, associated with coils C11 and C13, which are on either side coil C12, are each in a 1 state, they force FF12 to be in the 1 state, irrespective of the 0 output from coil C12. Likewise, if coil C5, instead of a 0, were to produce a 1 output to its FF5, since FF4 and FF6 are in a 0 state, they would drive FF5 to a 0 state, thereby preventing the number of 1's to erroneously increase from 8 to 9.

Figure 5:
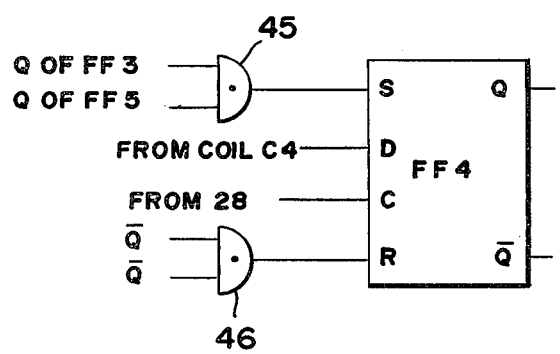
FIG. 5 is a diagram of a flip flop arrangement useful in denoting an aspect of the invention.

The forcing of a flip flop to assume the state of its neighboring flip flops, can be easily achieved with an arrangement as shown in FIG. 5, wherein only FF4 is diagrammed. Basically, it is a CD 4013 D-type flip flop which in addition to the D input from the coil and the C input for the clock has set (S) and reset (R) inputs. Two AND gates 45 and 46 are added. As to gate 45 it directly sets FF4 when both the Q outputs of FF3 and FF5 are high, thus setting FF4 to a high Q output, i.e. to a 1. As to gate 46, it directly resets FF4 to have a high $\overline{Q}$ output, i.e. to a 0, when both the $\overline{Q}$ outputs of FF3 and FF5 are high.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A system for guiding a vehicle along a path defined by a guide wire through which an AC current flows and around which a magnetic field is produced, the system comprising:
   n coils arranged in an array in a direction so as to sense the vertical component of the magnetic field about said wire, with those coils which are on one side of said wire having the vertical component of said field passing those coils in a first direction and the vertical component of said field passing through the remaining coils, which are on the other side of said wire, in an opposite second direction;
   control means coupled to said n coils for producing a control signal which is a function of the largest number of coils through which said magnetic field passes in said first direction;
   wherein said control means include n bistable means which are respectively associated with said n coils, with the bistable means which are associated with coils through which the vertical component of the magnetic field passes in said first direction being adapted to be driven to a first state, and those bistable means which are associated with coils through which the vertical component of the magnetic field passes in the second direction being adapted to be driven to a second state, said control means including output means for producing said control signal which is related to the largest number of bistable means in said first state.

2. A system for guiding a vehicle along a path as recited in claim 1 wherein said control means further include means for inhibiting a bistable means from changing state when the two bistable means adjacent thereto are in the same state, and for driving the bistable means to the state of the two adjacent bistable means.

3. A system for guiding a vehicle along a path as recited in claim 2 wherein said bistable means are clockable and said system further includes clock means for clocking said bistable means at a selected time during each cycle of the magnetic field.

4. A system for guiding a vehicle along a path as recited in claim 1 wherein said bistable means are clockable and said system further includes clock means for clocking said bistable means at a selected time during each cycle of the magnetic field.

5. A system for guiding a vehicle along a path as recited in claim 4 wherein said clock means include at least one coil for sensing the horizontal component of the magnetic field, with said bistable means being clocked at a selected time during each cycle when the magnetic flux passes through said at least one coil in a selected direction.

6. A system for guiding a vehicle along a path as recited in claim 5 wherein said bistable means are flip flops.

7. A guidance sensor resulting in an alternating magnetic field, the arrangement comprising:
   an array of n coils arranged in a direction perpendicular to the vehicle's direction of travel and positioned to sense the vertical component of the magnetic field, whereby during a particular half of each cycle of the magnetic field the vertical component of the magnetic field passes all the coils on one side of the wire in a first direction and passes all coils on the other side of the wire in a second direction;
   control means coupled to said coils for producing a control signal as a function of the largest number of coils through which said vertical component of the magnetic field passes in said first direction, wherein said control means include n flip flops, each associated with a different one of said n coils, each flip flop being drivable to a first state when its associated coil is one through which the vertical component of the magnetic flux passes in said first direction during the particular half of each cycle, and said control means include means for producing said control signal which is related to the largest number of flip flops in said first state.

8. A guidance sensor as recited in claim 7 further including means for clocking said flip flops during said particular half of each cycle.

9. A guidance sensor as recited in claim 8 further including circuit means coupling each flip flop to its two adjacent flip flop A guidance sensor as recited in claim 8 further including circuit means coupling each flip flop to its direction of passage of the vertical component of the magnetic flux through its associated coil, only when the adjacent flip flops are in different states.

* * * * *